INVENTOR
MELVIN F. EARNEST
ATTORNEYS

United States Patent Office 3,487,735
Patented Jan. 6, 1970

3,487,735
ANGLE BAR CUTTER
Melvin F. Earnest, Pittsburgh, Pa., assignor to PPG Industries, Inc., Pittsburgh, Pa., a corporation of Pennsylvania
Filed Feb. 26, 1968, Ser. No. 708,286
Int. Cl. B26d 3/08
U.S. Cl. 83—6
3 Claims

ABSTRACT OF THE DISCLOSURE

A scoring device for transversely scoring a moving ribbon of glass having an angled bar spanning the ribbon, a scoring device traveling across the bar, and a plurality of roller supports positioned beneath the glass so as to support the glass when the scoring device passes over the glass.

---

Figure 1:
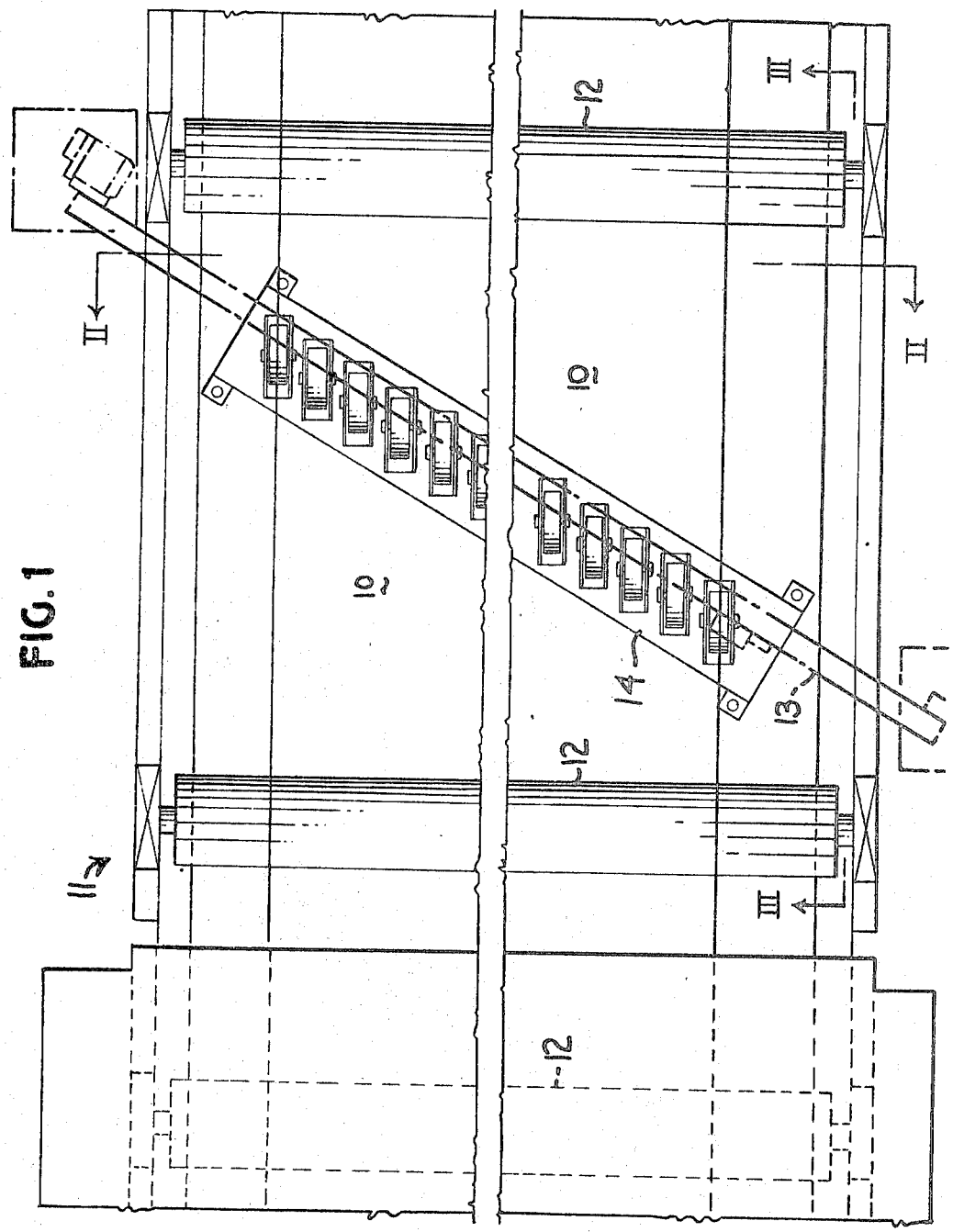

This invention relates to the construction and operation of apparatus for severing into segmented sheets a continuously moving glass ribbon, and more particularly to a method and apparatus for severing a glass ribbon supported on rolls.

In prior art proposals, the moving ribbon was either brought to a halt and scored or a moving support was positioned beneath the ribbon and then clamped onto the sides of the glass sheet, and proceeded to move along with the sheet to provide support therefor, while a scoring device was run across the sheet. The stationary severing apparatus of the prior art, because of the many manipulative steps required for cutting different size segments, has been a substantial limiting factor in the overall production of different size glass sheets. Difficulty is encountered in moving the glass into position for scoring operation, and subsequently conveying the scored, cut glass sheet away.

A problem in scoring a moving ribbon of glass has been the support of the ribbon during scoring. When roll-type supports are used, there is an undulating surface developed due to the space between the rollers. Thus, as a moving scorer went across the ribbon of glass, the pressure upon the ribbon varied as the supporting surface on the glass varied, i.e. when the glass was over the crest of the roll a firm support was provided, and when the scorer was between the crest of the rolls, there was a tendency for the glass to deflect and thus not to have a uniform pressure on contact with the scoring device.

U.S. Patent No. 3,244,337 issued Apr. 5, 1966 to Edward W. Curtze et al. disclosed methods of supporting the glass ribbon on a fluid film, scoring the ribbon while supported on the fluid and advancing the scored sheet to a severing apparatus, and then severing the ribbon into segmented sheets. The invention fully described below represents an improvement over the method of fluid support. The fluid support method requires extra equipment, that is a perforated support bed, and an air supply for supply air under pressure to support the glass over the air support table. When this method is used to score glass, small chips of the scoring sheet accumulated beneath the glass surface and between the surface and the support table. When a chip is lodged therein it will move about on the table until it becomes stuck in one of the air portholes. The moving ribbon of glass is then severely scored by the chip, requiring that the air table be temporarily removed from the operating line and the offending chip material removed.

This invention provides apparatus and a method of scoring a continuously moving ribbon of glass. The invention eliminates the disadvantage of the undulating surface resulting from the transverse roll support and also the disadvantage of the air support table while providing all of the advantages of a synchronized angle bar cutter which is capable of cutting moving ribbons of glass. The angle bar cutter also eliminates complex equipment which is used to support the glass in synchronization with a scoring device moving transversely across the moving ribbon.

The invention disclosed herein makes it possible to score a moving ribbon of glass and synchronize the scoring device with the speed of the ribbon to produce transverse score lines without interruption of the ribbon of glass, and the necessity of complex supporting and scoring equipment.

Figure 2:
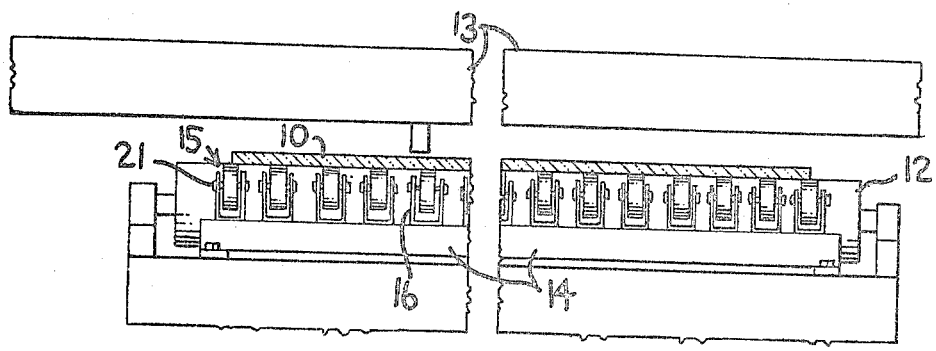
Figure 3:
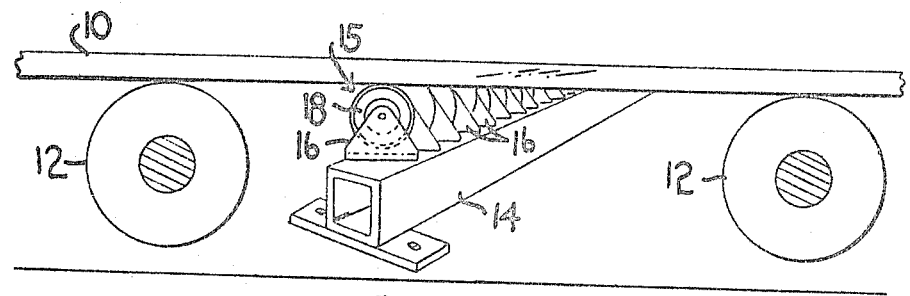
Figure 4:
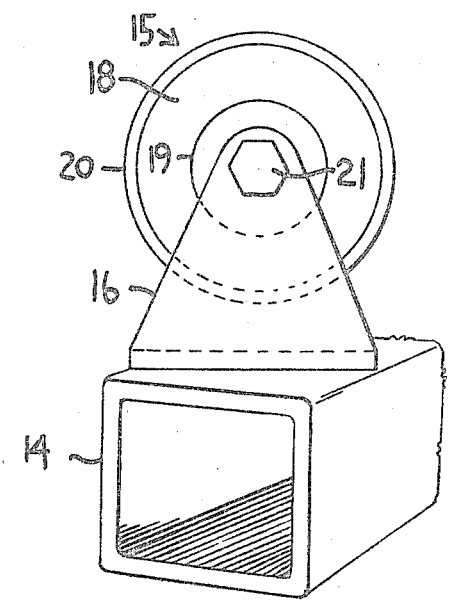

Referring now to the drawings:
FIG. 1 is a plan view of the apparatus for severing glass sheets;
FIG. 2 is an end view of the apparatus;
FIG. 3 is a side view of the apparatus; and
FIG. 4 shows a roll support.

A detailed description of a preferred embodiment of this invention follows.

A ribbon of glass 10 from a suitable glass source is conveyed onto run-in conveyor 11 having representative conveyor rolls such as roll 12. The glass ribbon is run onto a supporting surface of the conveyor line. Disposed across the line of glass travel is an angled bar cutter 13. Disposed beneath the line of travel of the glass at the center line of the angle bar cutter is a supporting bar 14. A plurality of 3-inch diameter rolls 15 are individually mounted on roll mounts 16. Each of the roll mounts is mounted at an angle to the line of glass travel. The roll mounts are mounted on a supporting bar which is a 6 x 6 inch rectangular or square tubing 14. As many as sixty-four individual rolls are mounted on the steel tubing. A line drawn through the center line of the roll supports forms an angle with the edge of the glass which is offset from the perpendicular. Each roll mount is in turn mounted in the direction of glass travel, thus forming an angle from the perpendicular with the center line of the roll mounts. Each succeeding roll mount is thus mounted at an increasing distance from a line perpendicular to the glass edge, the roll mounts at one edge of the glass being offset almost the distance between two major conveyor rolls.

Glass to be severed is run onto the roller conveyors 12 and is moved beneath the angle bar cutter 13. The actuation of appropriate circuits causes the scoring device to move transversely across the ribbon of glass. The angle of the scoring device is selected so that the transverse speed of the score is proportioned to the forward speed of the ribbon resulting in a transverse score. This arrangement provides support for the scored glass at a plurality of intervals across the width of the ribbon. The distance between the support rolls is approximately 2 inches. In effect, the glass sheet positioned beneath the scoring device is supported every 2 inches. The natural rigidity of the glass sheet prevents an undulation developing between the two supporting rolls. Thus, the glass sheet is supported throughout the entire path of travel of the scoring device at very frequent intervals, whereas in the previous prior art method of scoring glass on rolls the entire ribbon of glass was unsupported for practically its entire transverse length. This apparatus provides support for the scored glass which eliminates undulation, eliminates the costly and sometimes annoying air support table with its accompanying chip problem and provides a better quality glass edge when the glass is eventually severed. The distance between support positions provides a more uniform support for the glass beneath the scoring device. Suitable circuits such as described in U.S. Patent 3,244,337 and U.S. 3,282,140 can be utilized in activating the scoring device. A run-out conveyor is used to separate the cut sheets from the ribbon by accelerating the sheets from the production line and then speeding them toward a suitable warehouse or storeroom.

This invention provides both apparatus and a method of producing discontinuous sheets of glass cut to very accurate predetermined dimension. The combination of the angled scoring device on the disclosed support bed provide an economically feasible method for the continuous production of accurately sized sheets of glass from a continuously moving ribbon and eliminates the inaccuracies caused by the use of ponderously heavy reciprocating equipment and also eliminates any necessity of having a trailing support bed beneath the glass. The construction of the roll support is shown in FIG. 4. A suitable bracket 16 in the form of a U is used to support a supporting roll. The roll consists of a hub 18 mounted on a bearing 19. A neoprene ring 20 is mounted on the outside diameter of the hub. The entire roller assembly is mounted on a shoulder bolt 21 which passes through the bearing. The mounting of the support bracket on the steel tubing is done so as to insure that a line drawn through the center of the roll along the line of the shoulder bolt is perpendicular to the edge of the glass. Each succeeding roll across the ribbon is offset at an increasing distance from a perpendicular base line. The angle to be selected should be coincident with the angle required for the scoring device to produce transverse sheets. The method and apparatus of this invention provide a relatively simple, inexpensive, and very efficient support for the glass and eliminates undulation which is prevalent when glass is supported on prior art rolls.

What is claimed is:
1. An apparatus for cutting a glass ribbon which is carried forward on rollers comprising:
(a) an angled bar cutter transversely spanning a moving ribbon;
(b) an angled plurality of roller supports disposed beneath the angle bar cutter and aligned to support the glass positioned beneath the scoring device as it transversely scores the glass.
2. The apparatus of claim 1 wherein the roller supports are positioned along the path of travel of the scoring device at least every 2 inches.
3. Apparatus for scoring glass comprising:
(a) a beam disposed beneath said glass;
(b) an angled plurality of roller supports positioned on said beam, each roller being positioned at less than the perpendicular angle to the center line of said beam;
(c) an angled bar cutter disposed transversely above said glass; said beam and said bar being aligned along their center lines so as to position the roller supports along the path of travel of said scoring device and to support said glass at least every 2 inches as it is disposed over said rolls.

References Cited

UNITED STATES PATENTS 3,282,140   11/1966   Sasabuchi et al. _____ 83—7

WILLIAM S. LAWSON, Primary Examiner